Figure 1:
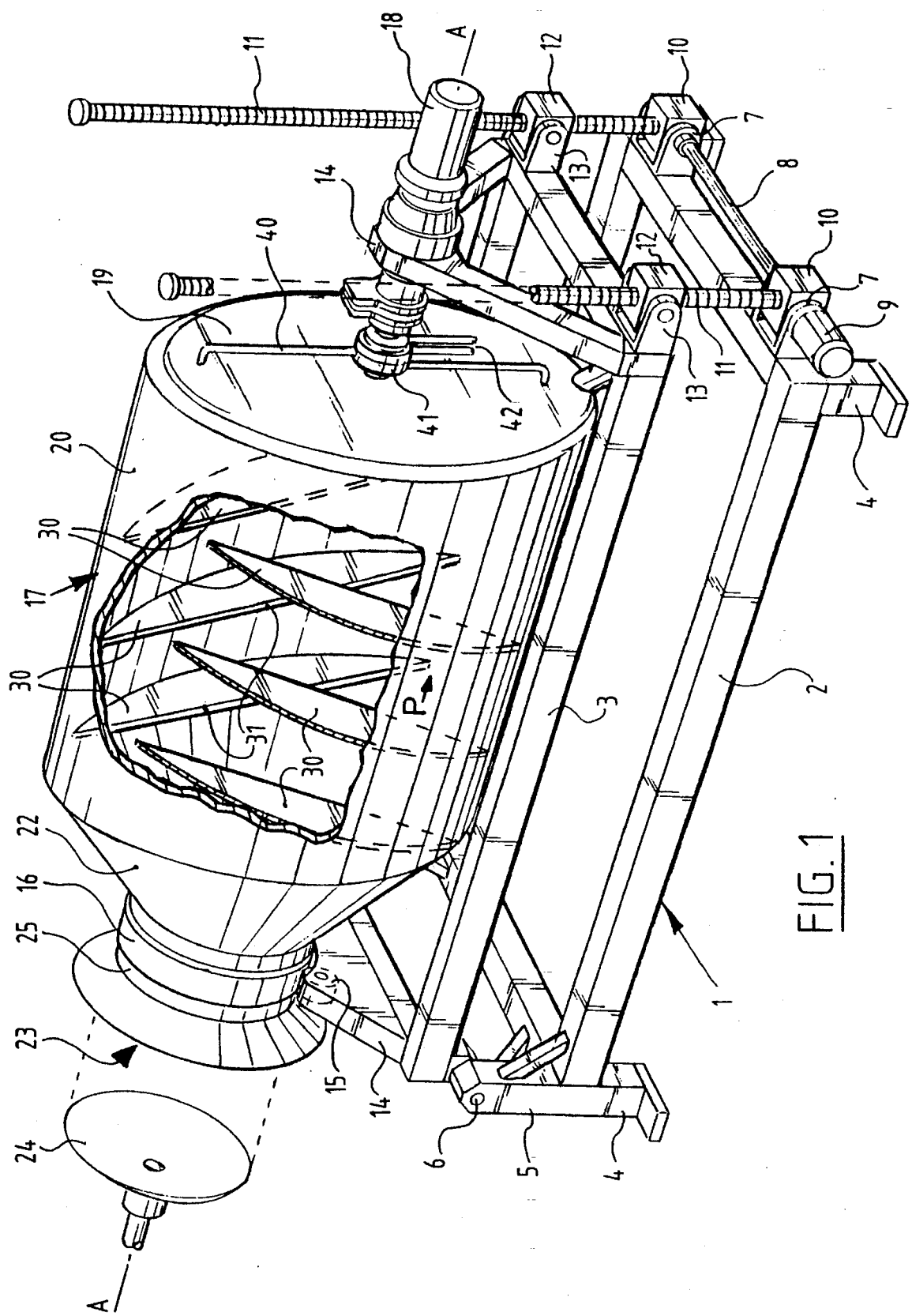

United States Patent [19]

Van Haren et al.

[11] Patent Number: 5,492,499
[45] Date of Patent: Feb. 20, 1996

[54] DEVICE FOR MASSAGING A PORTION OF MEAT

[75] Inventors: Lambertus F. W. Van Haren, Druten; Henricus W. Van Doorne, Boxmeer, both of Netherlands

[73] Assignee: Stork Protecon-Langen B.V., Netherlands

[21] Appl. No.: 305,474

[22] Filed: Sep. 13, 1994

[30] Foreign Application Priority Data

Sep. 13, 1993 [NL] Netherlands .................... 9301578

[51] Int. Cl.$^6$ .................................................. A22C 9/00
[52] U.S. Cl. ...................... 452/141; 366/57; 366/337; 426/641
[58] Field of Search .................... 452/141; 426/519, 426/641; 366/57, 46, 102, 336, 337, 338, 340, 341, 147

[56] References Cited

U.S. PATENT DOCUMENTS

| | | | |
|---|---|---|---|
| 4,441,231 | 4/1984 | Baccetti | 452/141 |
| 4,461,660 | 7/1984 | Binet et al. | 366/57 |
| 4,643,584 | 2/1987 | Allocca | 366/337 |
| 4,657,771 | 4/1987 | Gould | 426/641 |
| 4,963,032 | 10/1990 | Strehlow | 366/57 |
| 5,104,232 | 4/1992 | Lennox, III | 366/147 |

FOREIGN PATENT DOCUMENTS

| | | | |
|---|---|---|---|
| 0391492 | 10/1990 | European Pat. Off. | A22C 9/00 |
| 0448149A1 | 9/1991 | European Pat. Off. | A22C 9/00 |
| 1524364 | 3/1967 | France | A23B 1/00 |
| 2807059 | 8/1979 | Germany | A22C 7/00 |
| 9206589 U | 11/1992 | Germany | A22C 9/00 |
| 571823 | 1/1976 | Switzerland | A22C 9/00 |
| 891047 | 12/1981 | U.S.S.R. | A22C 9/00 |
| 1232905 | 5/1971 | United Kingdom | A22C 9/00 |
| WO9103952 | 4/1991 | WIPO | A23P 1/00 |

Primary Examiner—Willis Little
Attorney, Agent, or Firm—Webb Ziesenheim Bruening Logsdon Orkin & Hanson

[57] ABSTRACT

A device for massaging a portion of meat, which device comprises a frame and a vessel supported in that frame and driven rotatably on a lying axis, said vessel has a longitudinal wall and two end walls, wherein agitation members are arranged in the vessel, wherein the inner side of the longitudinal wall of the vessel is provided with agitation members standing thereon, wherein the agitation members are formed by hollow bodies, the closing edge of which is situated outside the vessel, so providing an easy discharge and cleaning of the vessel, whereas the agitating members can be easily constructed.

20 Claims, 5 Drawing Sheets

5,492,499

DEVICE FOR MASSAGING A PORTION OF MEAT

The invention relates to a device for massaging a portion of meat, which device comprises a frame and a vessel supported in that frame and driven rotatably on a lying axis, said vessel has a longitudinal wall and two end walls, wherein agitation members are arranged in the vessel.

Such a device is known in very many embodiments, wherein the cross section of the vessel has a circular form. Within the vessel blades are provided, which are movable independently of the rotation of the vessel and therefore apply a massage to the meat. The drawback to such members in the vessel is that they make difficult the discharging of the vessel and the subsequent cleaning. The members present in the vessel are moreover of quite complicated construction.

The invention has for its object to obviate the above stated drawbacks by providing a device which is distinguished in that the inner side of the longitudinal wall of the vessel is provided with agitation members standing thereon, wherein the agitation members are formed by hollow bodies, the closing edge of which is situated outside the vessel.

Owing to such agitation bodies the construction is very simplified and cooling of the meat mass is assured. According to a further feature the agitation members are formed by folded plates, wherein the fold is situated at least partially in the vessel and the edges of the folded plates are closed outside the vessel by means of a welded strip.

As the welds of the hollow agitation bodies are located outside the vessel, possible leakage will not affect the meat mass to be massaged. The invention further relates to a device for massaging a portion of meat, which device comprises a frame and a vessel supported in that frame and driven rotatably on a lying axis, which vessel has a longitudinal wall and two end walls, in which wall a charging and/or discharging opening is arranged for the meat and/or cleaning liquid, which is distinguished in that the inner side of the longitudinal wall of the vessel is provided with a pattern of agitation members standing thereon, which pattern has at least a wall portion preferably extending axially from the opening which is without these agitation members so as to form a free flow path for the meat mass for massaging or cleaning liquid.

Due to the free wall portion, which extends as a strip portion of the inner wall towards and away from the discharging and charging opening, the massaged meat mass respectively the cleaning liquid can flow away freely to this opening when the vessel is emptied. The opening for feeding the cleaning liquid can also be the opening for charging and discharging the meat mass, but can also be arranged separately thereof in the vessel.

The members are preferably formed as straight plates which, in accordance with a further development, extend at an angle relative to the axis of rotation. This causes a transport on the meat in the lengthwise direction of the vessel, which likewise contributes to a better massage.

In another embodiment the cross section of the vessel is non-round, for instance elliptical. Due to the non-round cross section of the vessel, a part of the vessel, normally that part situated under the rotation axis, will continually change shape, which change of shape applies a massage to the portion of meat because the cross section of the portion of meat likewise changes. This already brings about the required massage of the meat, which can nevertheless be enhanced by said agitating members extending on the inner wall of the vessel which co-rotate with the vessel. The plate-like members are preferably arranged along those parts of the inner side of the vessel which have the largest radius of curvature. Herewith is achieved that in a certain position, when the ellipse form stands upright, the vessel can be emptied without problem because the meat does not encounter any hindrance from the members in the vessel. Furthermore, when the volume is the same as in the case of a circular cross section, a greater standing height results in the vessel, which facilitates cleaning thereof.

Figure 2A:
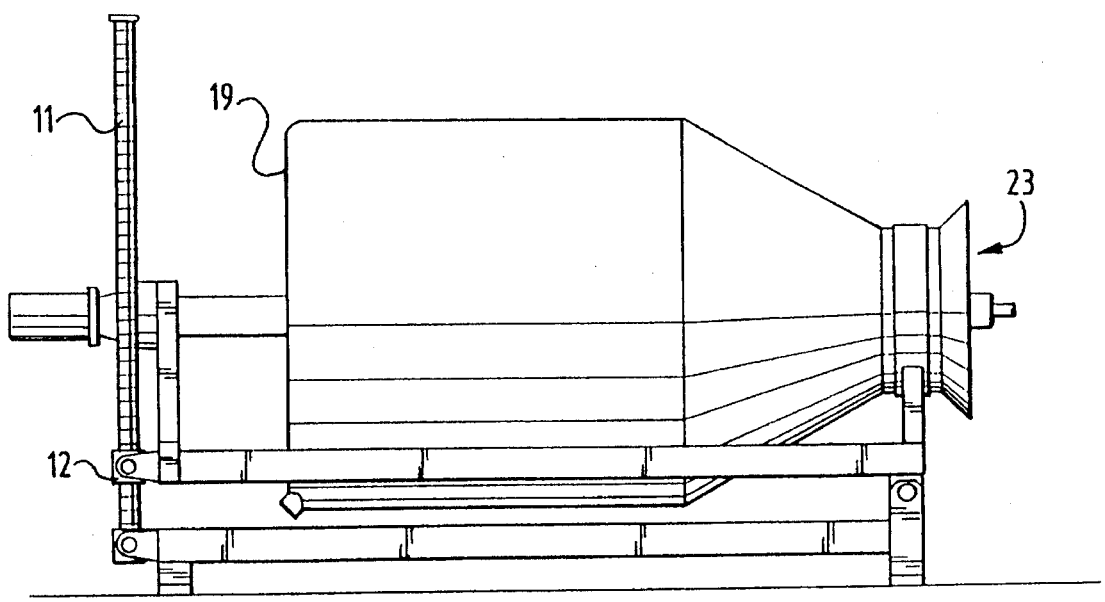
Figure 3A:
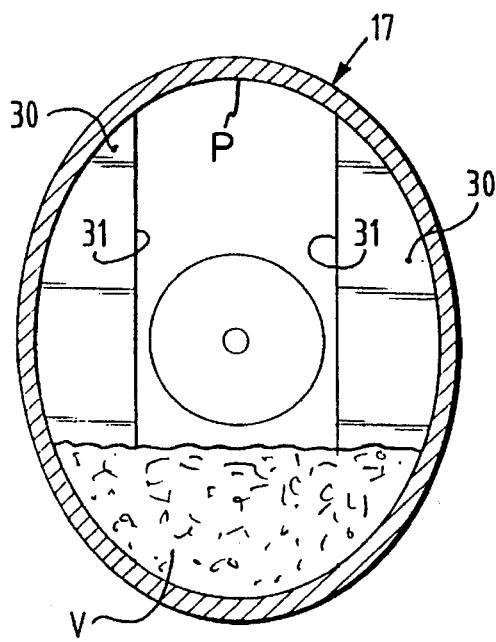
Figure 4:
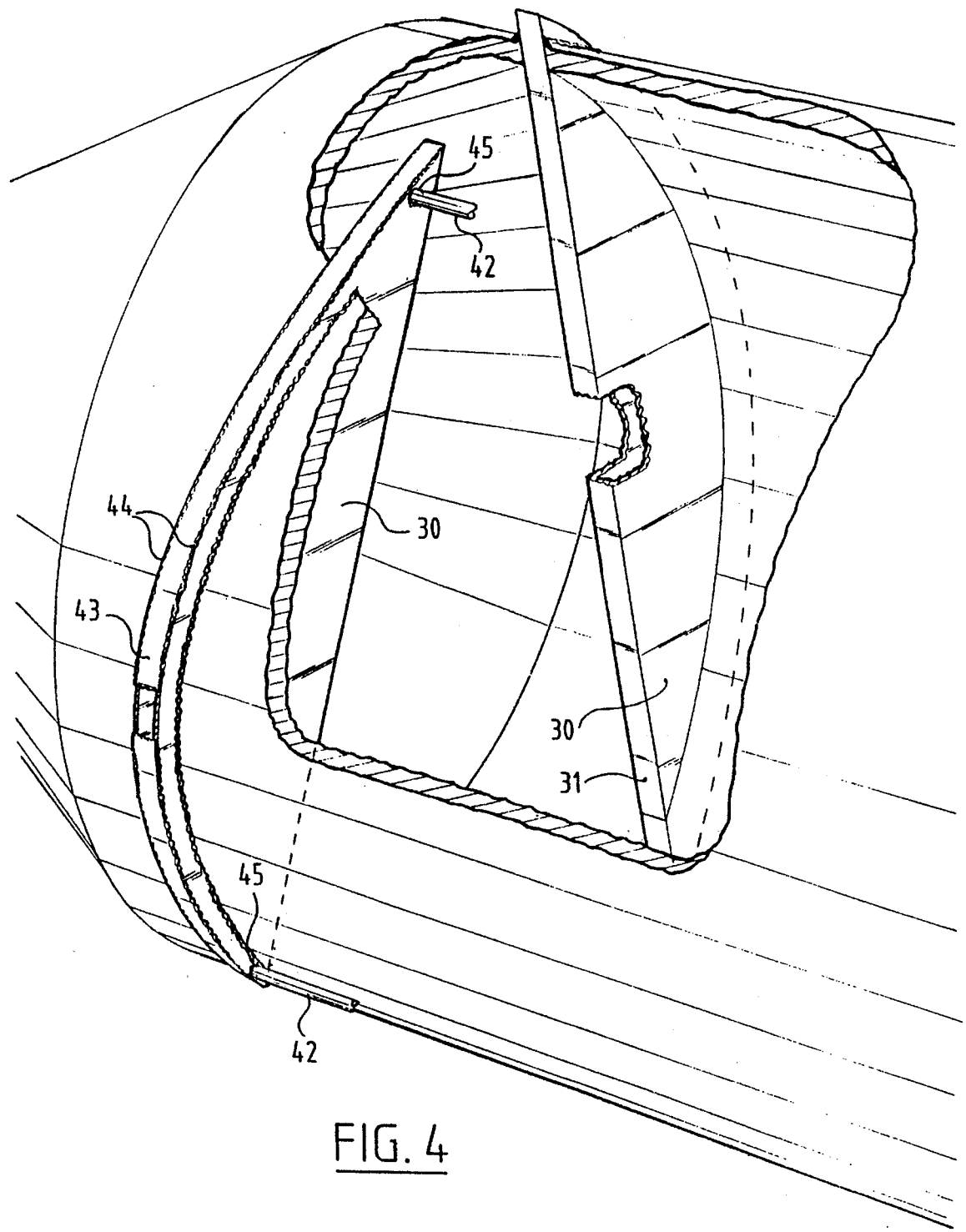
Figure 5:
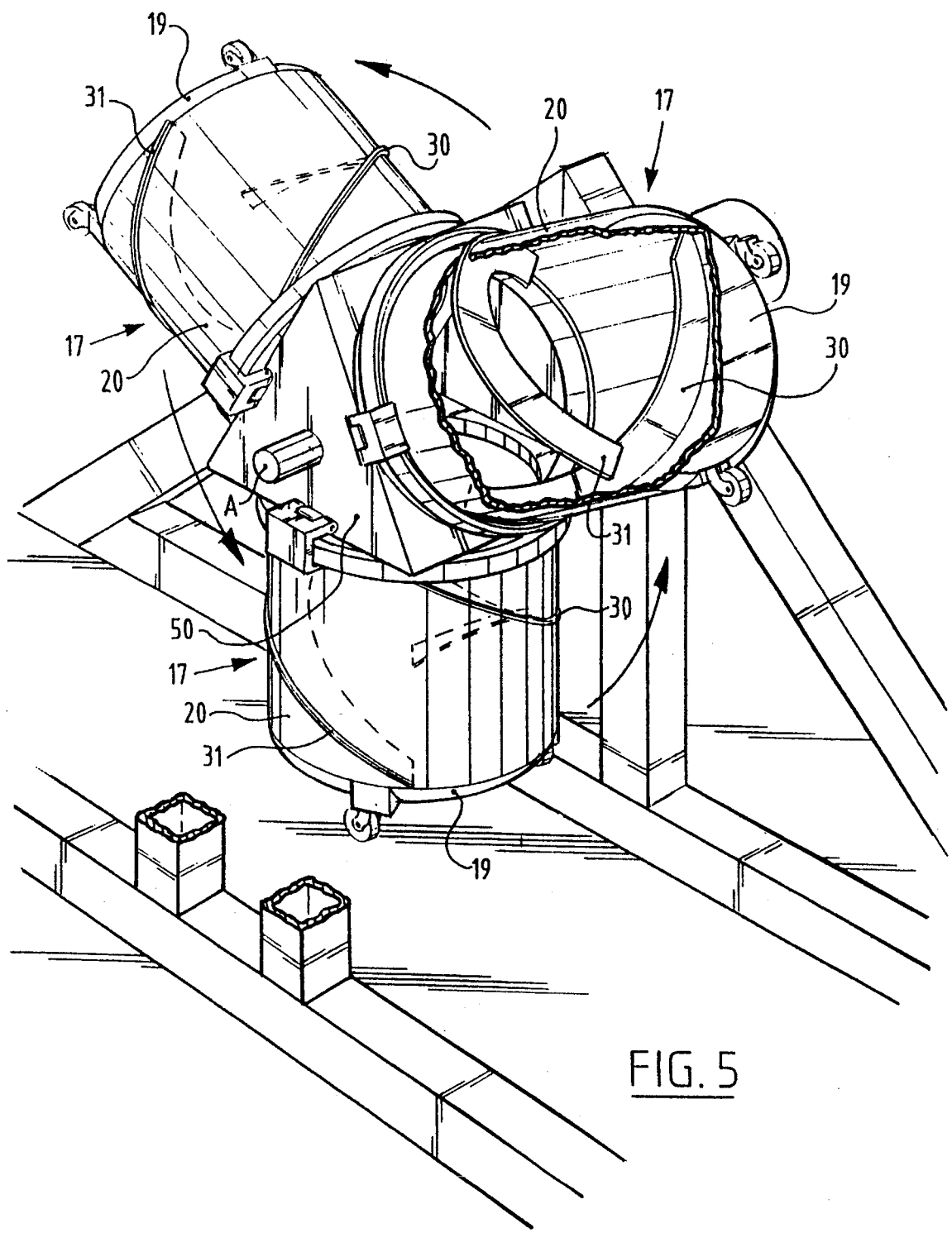

Above mentioned and other features of the invention will be further elucidated in the figure description of an embodiment hereinbelow. In the annexed drawings:

FIG. 1 shows a perspective top view of a device according to the invention,

FIGS. 2a, b show in each case a standing side view of the vessel of FIG. 1 in another operating position, FIG. 3a, b, c and d show in each case a cross section of a possible vessel shape suitable for massaging a portion of meat according to the invention, FIG. 4 is a perspective detail view of a preferred embodiment, FIG. 5 is a front view of a variant of vessels according to the invention.

Designated in FIG. 1 with the numeral 1 is the frame which can be constructed in random manner and consists here of a fixed frame 2 and a frame 3 tiltable relative thereto. Frame 2 consists of a rectangular framework which is supported at the four corners by legs 4 for placing on a ground. The legs on the left in FIG. 1 are extended with a post 5, on the top ends of which is arranged a pivot 6 for receiving the left-hand end of the movable frame 3.

The right-hand end of the fixed frame 2 is embodied with eyes 7 in which is mounted a drive shaft 8 which is driven by a motor 9. Drive shaft 8 is embodied at both sides of the fixed frame 1 with a right-angle transmission 10 for causing rotation of a screwed spindle 11 which co-acts with a nut body 12 which is pivotally mounted in similar manner in eyes 13. In this way the right-hand end of the movable frame 3 is movable up and downward. The movable frame is provided on either side with a support 14, whereof the support 14 drawn on the left of FIG. 1 is provided with travel wheels 15 for supporting an annular guide 16 in which is received an end of the massage vessel 17. The support 14 drawn on the right in FIG. 1 supports a rotation shaft which is driven by a drive motor 18, wherein the left-hand end of the rotation shaft is fixed to the end wall 19 of vessel 17.

Vessel 17 consists of a longitudinal wall 20 which joins at one end to the end wall 19 and at the other end is provided with a conical end wall portion 22 with charging and discharging opening 23 which is closable by a cover 24. The conical end wall 22 also comprises a cylindrical part 25 around which is arranged the guide 16. It wall be apparent that the charging and discharging opening 23, when provided with suitable connecting means, can be connected to a source of vacuum, overpressure or to a feed of gas, for instance $CO_2$, so that the relevant atmosphere can be transmitted to the vessel, or filling or emptying can take place under this atmosphere.

Figure 2B:
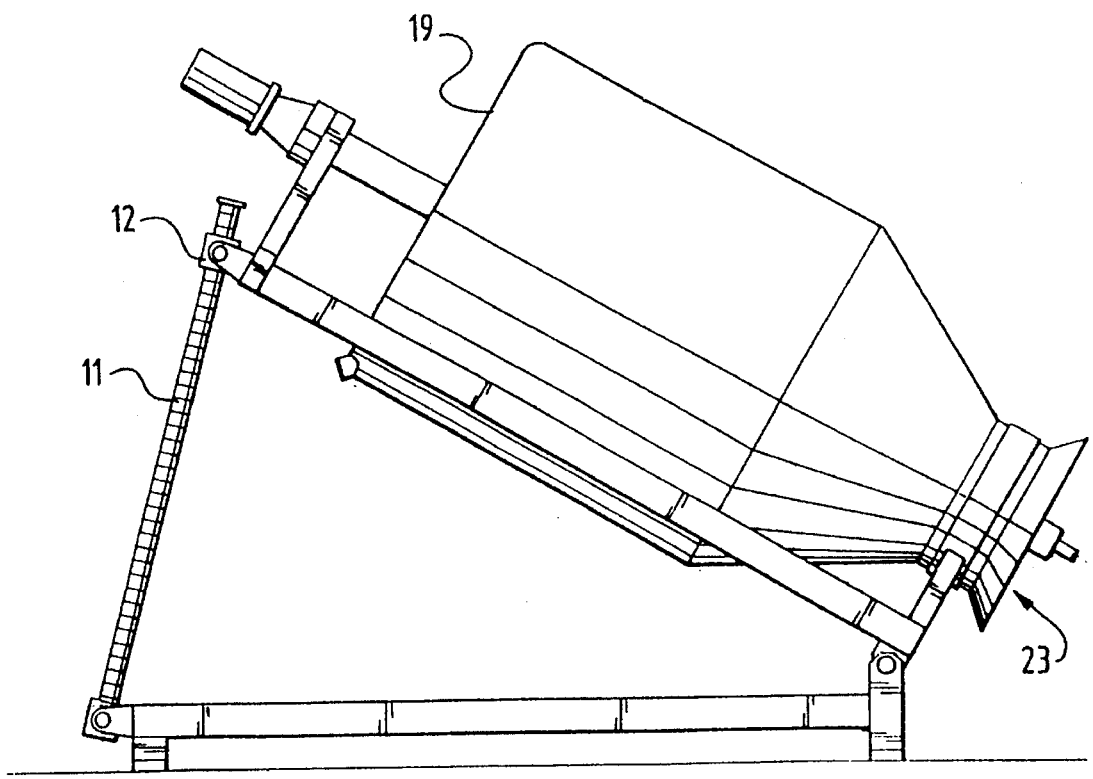

It will be apparent from the above the by driving the motor 18 the vessel 17 is rotatable on a lying axis, which is designated A—A in FIG. 1, wherein the angle of inclination of the lying axis A—A is adjustable by means of the drive mechanism 4-13. The position can therefore change from the purely horizontal position as according to FIG. 2a to a reclining position as according to FIG. 2b and a position (not shown) opposed to the angle of inclination of FIG. 2b, wherein the end wall 19 comes to lie higher than the charging and discharging opening 23. These positions are reached by rotating the screwed spindles 11 and displacing the nut blocks 12 relative to these spindles 11. Arranged on one side of the vessel against the rear wall 21 and at the greatest possible distance from the centre is a washing opening which is closed off by a cap 50. By placing the vessel in the correct position cleaning water will drain off through this opening.

Figure 3B:
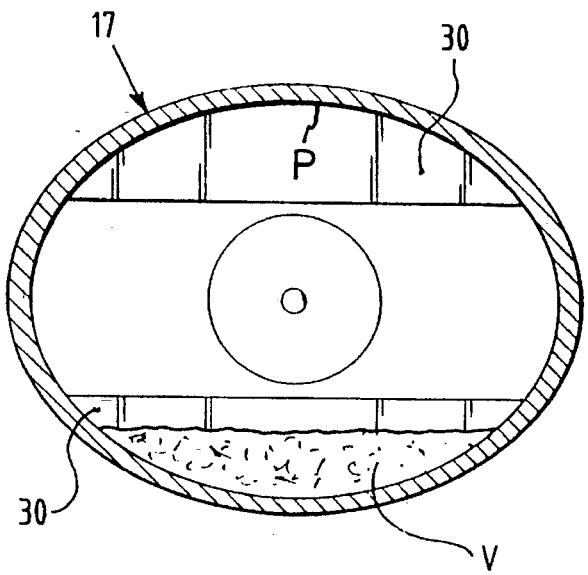

According to the characteristic of the invention the cross section of the vessel 17 is non-round and, in the preferred embodiment, elliptical as shown in FIG. 3a and 3b. FIG. 3a and 3b show schematically that a portion of meat V in the position of FIG. 3a lies held in a relatively narrow cross section defined by the narrow ends of the ellipse shape. On rotation through 90° the meat will be spread out over the board part of the ellipse and assumes a different cross sectional form. It will be apparent that when rotated continuously the portion of meat V changes cross section continuously, which applies a massaging action thereto.

It is noted that along the inner side of the longitudinal wall 20 of vessel 17 are arranged plate-like members 30 which run straight and in the embodiment shown in FIG. 1 enclose an angle varying from 90° with the axis of rotation A—A. The plates 30, see FIG. 3a, close sealing along that inner side of the ellipse shape which has the largest radius of curvature, wherein the free edge 31 is straight and runs parallel to that of the opposite plate 30. Due to this oblique position the quantity of meat situated between the plates 30 will also be subjected to a force in lengthwise direction, that is, parallel to the axis of rotation A—A, whereby this portion of meat is displaced. Due to the opposed angle of slope of the opposite plates this meat is carried back during the rotary movement of the vessel so that a continuous rotation and therein compression and spreading of the portion of meat takes place. As shown in FIGS. 1 and 3a–3d, the longitudinal wall of the vessel is provided with a pattern of agitation members standing thereon. The pattern has at least a wall portion of the longitudinal wall extending axially from the opening which is without these agitation members so as to form a free flow path P for the meat mass for massaging or cleaning liquid. Due to the free wall portion, which extends as a strip portion of the inner wall toward and away from the discharging and charging opening, the massaged meat mass or cleaning liquid can flow away freely to the opening when the vessel is emptied.

Figure 3C:
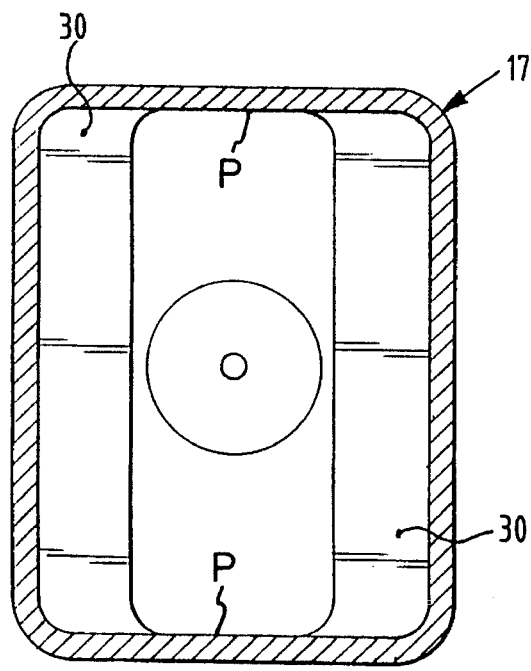

Other cross sections are possible within the scope of the invention. FIG. 3c shows for instance an embodiment wherein the vessel has a longitudinal wall having in cross section a practically rectangular form with rounded corners. The plates 30 are arranged along the long inner side.

Figure 3D:
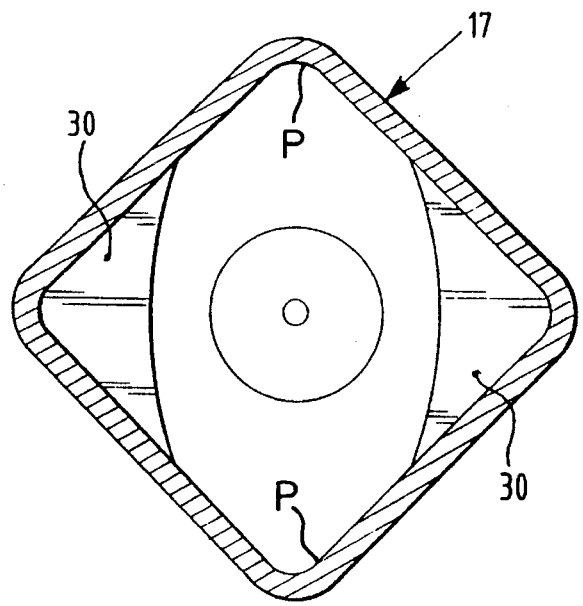

FIG. 3d shows a square or diamond-shaped embodiment wherein the plates 30 are arranged along the corners. The action of compacting and spreading the portion of meat takes place in the same way as described above with reference to the elliptical cross section.

It is further noted that the access to the elliptical vessel in particular can take place through the charging and discharging opening 23 so that a serviceman can enter the vessel for cleaning or repair purposes. The serviceman is able to work in the vessel standing upright without encountering any hindrance from the plates 30 when the vessel stands in the position according to FIG. 3a.

Because the agitation members are fixed against the wall parts located close to each other, there remains between the agitation members and the wall parts located far apart a space which can be entered easily by a serviceman or cleaner, possibly even standing up.

Finally, it is noted that the contents of the vessel can be cooled by a cooling system designated with the pipe 40 which is connected along the end wall 19 from a rotatable fluid coupling 41 to a feed and discharge conduit 42. The pipe 40 communicates with conduits or channels which are components of the members 30 and which extend along the vessel wall 17.

The embodiment depicted in FIG. 4 differs from the preceding embodiments in the construction of the agitation members. In the embodiment shown in FIG. 4 the agitation members 30 are formed by folded plates which are folded such that their fold is situated at least partially on the inner side of the vessel. It is however more important that there are no weld seams on the inner side of the vessel. This prevents as far as possible the danger of coolant leakage; when coolant leaks into the vessel the contents of the vessel, which usually represent a considerable value, are lost. Should leakage occur in a weld seam outside the vessel the consequences are not so disastrous. The folded plates are closed on their non-folded side by a strip 43 which is joined to the folded plate by means of weld seams 44. Apertures 45 are further arranged in the plate for connections to feed and discharge conduits 42 for coolant. These of course extend on the outer side of the vessel.

In FIG. 5 a further embodiment of the device according to the invention is shown, wherein three vessels 17 are used, each vessel being provided with a longitudinal wall 20 and a bottom wall 19. The side opposite to the bottom wall 19 of the vessel 17 is open, whereas the top rim of the longitudinal wall 20 is provided with locking means in order to connect the vessel 17 to a support 50 which is suspended in a frame (not shown) and which is rotatably driven around the central axis A, being perpendicular to the plane of drawing in FIG. 5.

The vessel wall 20 is provided with agitating bodies 30, 31 as depicted in FIG. 1 in order to provide massaging members.

The members can be cooled by a coolant, whereto the bodies are hollow and constructed in the wall as depicted in FIG. 4. That means that the welds are located on the outside of the vessel wall 20 in order to prevent any damage to the mass of meat to be massaged, in case of leakage.

By turning the support 50 around axis A it will be clear that the massaging will take place as the vessels 17 will be turned upside down and vice versa. The vessels 17 can be charged and discharged by disconnecting the upper rim from the support 50 and to roll them away upon the castors 51 underneath the bottom wall 19.

Other embodiments are possible within the scope of the invention. The members 30 standing outward into the vessel on the inner side thereof do not for instance have to be precisely straight but can also have a curved or helical form. The members may also be tooth-shaped or blade-shaped.

We claim:

1. A device for massaging a portion of meat, comprising: a frame; a vessel supported by said frame, said vessel including a wall having an inner side; and an agitation member arranged in a standing position along the inner side of the wall of the vessel, wherein said agitation member is formed by a hollow body having a closing edge situated outside of said vessel.

2. A device as claimed in claim 1, wherein said agitation member is formed by a folded plate, and wherein the fold is situated at least partially in the vessel and the edges of the folded plate is closed outside the vessel by means of a welded strip.

3. A device for massaging a portion of meat, comprising: a frame; a vessel supported by said frame, said vessel including a longitudinal wall having an inner side and two end walls, wherein a charging and/or or discharging opening for the meat and/or cleaning liquid is included in one of said walls; and a plurality of agitation members arranged in a standing position along the inner side of the longitudinal wall of the vessel in a pattern configured such that a wall portion of the inner side of the longitudinal wall extending from the opening and axially along the inner side of the longitudinal wall is free from said agitation members so as to form a substantially straight free flow path along substantially the entire length of the vessel for the portion of meat to be massaged or cleaning liquid.

4. A device as claimed in claim 1, wherein said agitation member is formed by a substantially straightened body.

5. A device as claimed in claim 1, wherein said vessel is rotatably driven about a lying axis and said agitation member extends at an angle relative to the axis of rotation which varies from 90°.

6. A device as claimed in claim 3, wherein said agitation members each include a plate-like member provided with channels are through-feed for a coolant.

7. A device as claimed in claim 1, wherein a cross section of said wall has a non-round form whereby a portion of the cross section momentarily changes shape from a narrow form to a broad form as said longitudinal wall is rotated about an axis.

8. A device as claimed in claim 7, wherein the cross section has an elliptical shape.

9. A device as claimed in claim 7, wherein the cross section has an elliptical shape and said agitation members are arranged along sides of said longitudinal wall with a large radius of curvature.

10. A device as claimed in claim 3, wherein said vessel is rotatably driven about a lying axis and said agitation member is formed by substantially straightened bodies.

11. A device as claimed in claim 10, wherein said agitation member extends at an angle relative to the axis of rotation which varies from 90°.

12. A device as claimed in claim 4, wherein said agitation members each include a plate-like member provided with channels as through-feed for a coolant.

13. A device as claimed in claim 5, wherein said agitation members each include a plate-like member provided with channels as through-feed for a coolant.

14. A device as claimed in claim 3, wherein a cross section of said longitudinal wall has a non-round form whereby a portion of the cross section momentarily changes shape form a narrow form to a broad form as said longitudinal wall is rotated about an axis.

15. A device as claimed in claim 14, wherein the cross section has an elliptical shape.

16. A device as claimed in claim 14, wherein the cross section has an elliptical shape and said agitation members are arranged along the sides with a large radius of curvature.

17. A device for massaging a portion of meat, comprising: a frame; a vessel supported by said frame, said vessel including a longitudinal wall having an inner side and two end walls wherein a charging and/or discharging opening for the meat and/or cleaning liquid is defined by one of said walls; and a plurality of agitation members arranged in a standing position along the inner side of the longitudinal wall of the vessel, each of said agitation members is formed by a hollow body having a closing edge situated outside of said vessel, wherein said agitation members are arranged in a standing position along the inner side of the longitudinal wall of the vessel in a pattern that provides at least a wall portion extending from the opening, which is free from said agitation members so as to form a free flow path for the portion of meat to be massaged or cleaning liquid.

18. A device as claimed in claim 17, wherein said agitation members are formed by a folded plate and wherein the fold is situated at least partially in the vessel and the edges of the folded pate is closed outside the vessel by means of a welded strip.

19. A device as claimed in claim 18, wherein said agitation member is formed by substantially straightened bodies.

20. A device as claimed in claim 18, wherein said vessel is rotatably driven about a lying axis and said agitation member extends at an angle relative to the axis of rotation which varies form 90°.

* * * * *

UNITED STATES PATENT AND TRADEMARK OFFICE
CERTIFICATE OF CORRECTION

PATENT NO.   : 5,492,499
DATED        : February 20, 1996
INVENTOR(S)  : Lambertus F.W. Van Haren and
               Henricus W. Van Doorne It is certified that error appears in the above-indentified patent and that said Letters Patent is hereby corrected as shown below:

Column 2 Line 58 "above the" should read --above that--.

Column 3 Line 24 "sealing" should read --sealingly--.

Column 4 Line 37 "wall" should read --way--.

Claim 3 Line 1 Column 5 "and/or or" should read --and/or--.

Claim 6 Line 20 Column 5 "are" should read --as--.

Claim 14 Lines 6-7 Column 6 "form a narrow form" should read --from a narrow form--.

Claim 20 Line 38 Column 6 "form" should read --from--.

Signed and Sealed this

Twenty-eighth Day of May, 1996

Attest:

BRUCE LEHMAN

*Attesting Officer*    *Commissioner of Patents and Trademarks*